May 31, 1932. H. CHARLTON 1,860,992
BIRD CAGE
Filed March 1, 1930
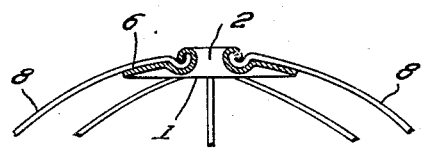
Fig. 1
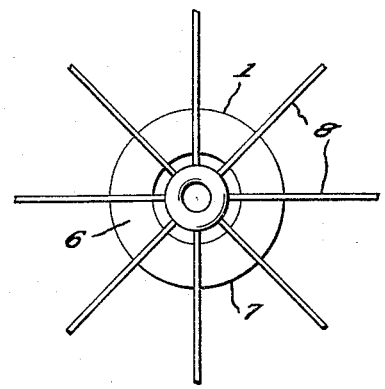
Fig. 2
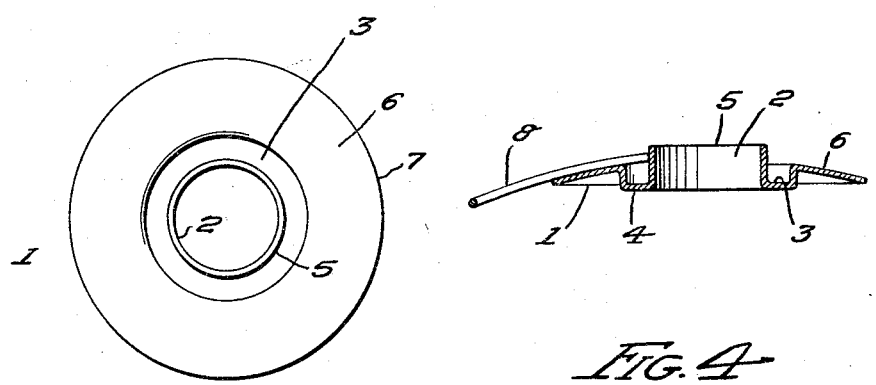
Fig. 4
Fig. 3
INVENTOR:
H. Charlton
BY H. J. Sanders
ATTORNEY Patented May 31, 1932

1,860,992

UNITED STATES PATENT OFFICE

HAROLD CHARLTON, OF CHICAGO, ILLINOIS

BIRD CAGE

Application filed March 1, 1930. Serial No. 432,495.

This invention relates to improvements in bird cages and more particularly to cage top construction and its object is to provide a cage of the substantially dome-shaped-top type wherein the wires of the dome are pressed or crimped into engagement with a one-piece crown disc thus providing a sanitary, easily cleaned, light weight construction that is durable in use and inexpensive to manufacture.

With the foregoing and other objects in view the invention consists in the combination and arrangement of parts to be hereinafter fully described, pointed out in the claims and illustrated in the accompanying drawings which form a part of this application for patent and in which—

Fig. 1 is a fragmentary sectional view of a cage top constructed according to the present invention.

Fig. 2 is a top plan view of the cage top.

Fig. 3 is a top plan view of the crown disc alone.

Fig. 4 is an enlarged fragmentary sectional view of the top before the crown disc is crimped into engagement with the wires.

Like reference characters denote corresponding parts throughout the several views.

Wire bird cages generally and those of the dome-shaped-top type particularly are complicated and rendered expensive to manufacture by tops of anything but simplified construction. Complicated top structures require several operations in their manufacture thus consuming time as well as money in their production. It is the purpose of the present invention to eliminate these objectionable features and to provide a cage top having a single crown disc to which the ends of the dome wires are pressed or crimped with the result that a cage top of attractive appearance and long life is produced.

The present cage top comprises a one-piece crown disc 1 of circular shape formed with a large central perforation defined by the annular hub portion 2 which portion is surrounded by the circular groove 3 upon one side of the disc thus forming the boss 4 upon the opposite side, the periphery of said boss being flush with or in the plane of one termination of the hub, the opposite termination 5 of the hub rising above the surface of the balance of the disc or crown.

From the outer wall of the groove 3 the disc is bevelled downwardly or in the direction of the boss to form the skirt 6, the terminal edge 7 of which is disposed in a plane parallel to but spaced upwardly from the boss 4 so that the disc, if placed upon a level or flat surface will rest upon the boss with the edge 7 of the skirt spaced slightly thereabove.

The dome or body wires 8 are placed with their ends resting upon the skirt 6 and their terminations abutting the hub 2. The end 5 of the hub is now rolled outwardly and caused to crimp or press the wire ends against the hub and into the groove 3, as clearly shown in Fig. 1 thus securely fastening the several wires to the crown disc without the use of separate fastening means.

What is claimed is:—

1. In bird cage construction, a one-piece crown disc of circular shape comprising an annular hub portion having a rolled edge and a skirt portion separated therefrom by a grooved portion, and a plurality of wires converging upon said skirt portion and received by the said grooved portion and rolled hub edge.

2. In bird cage construction, a one-piece crown disc of circular shape comprising an annular hub portion having an outwardly rolled edge and a skirt portion separated therefrom by a deep grooved portion, and a plurality of wires spaced equidistant one from the other converging upon said skirt portion and received by the said grooved portion and outwardly rolled hub edge.

In testimony that I claim the foregoing as my own I have hereto affixed my signature.

HAROLD CHARLTON.